United States Patent
Fujimoto et al.

(10) Patent No.: US 8,597,755 B2
(45) Date of Patent: Dec. 3, 2013

(54) RESIN WELDED BODY AND MANUFACTURING METHOD THEREOF

(75) Inventors: Seizo Fujimoto, Tokyo (JP); Takafumi Hara, Tokyo (JP); Shinsuke Asada, Tokyo (JP); Hiroshi Kobayashi, Tokyo (JP); Masaaki Taruya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 872 days.

(21) Appl. No.: 11/892,039

(22) Filed: Aug. 20, 2007

(65) Prior Publication Data

US 2008/0261065 A1 Oct. 23, 2008

(30) Foreign Application Priority Data

Apr. 20, 2007 (JP) ................. 2007-111985

(51) Int. Cl.
*B32B 9/00* (2006.01)
*B29C 65/16* (2006.01)

(52) U.S. Cl.
USPC .............................................. 428/57; 428/53

(58) Field of Classification Search
USPC ..................................... 428/57, 53
See application file for complete search history.

(56) References Cited

U.S. PATENT DOCUMENTS

| 2004/0200569 A1 | 10/2004 | Weiblen et al. |
| 2004/0239007 A1* | 12/2004 | Arai et al. ..................... 264/482 |
| 2005/0145330 A1* | 7/2005 | Shubinsky et al. ......... 156/272.8 |

FOREIGN PATENT DOCUMENTS

| DE | 202-03-773 U1 | 7/2002 |
| DE | 10131430 A1 | 1/2003 |
| JP | 7-21333 U | 4/1995 |
| JP | 2001-246488 A | 9/2001 |
| JP | 2002337236 A * | 11/2002 |
| JP | 2004-209916 A | 7/2004 |
| JP | 2005-508262 A | 3/2005 |

* cited by examiner

*Primary Examiner* — Brent O'Hern
(74) *Attorney, Agent, or Firm* — Sughrue Mion, PLLC

(57) ABSTRACT

A resin welded body where a first resin part that is absorbent with respect to laser light and a second resin part that is transparent with respect to laser light are fitted together and the laser light is emitted to a predetermined position from the side of the second resin part to weld together the first and the second resin parts and form a joint portion between both resin parts, wherein on either the first or the second resin part there is disposed a projection that comes into contact with the other resin part during the welding and regulates the sinking amount at the joint portion.

3 Claims, 5 Drawing Sheets

RESIN WELDED BODY AND MANUFACTURING METHOD THEREOF

BACKGROUND OF THE INVENTION

1. Field of the Invention

The present invention relates to a resin welded body where a resin part that is transparent with respect to laser light and a resin part that is absorbent with respect to laser light are joined together using laser light and to a manufacturing method thereof.

2. Description of the Related Art

A laser light welding method where a resin part that is transparent with respect to laser light of a predetermined wavelength and a resin part that is absorbent with respect to laser light of the same wavelength are combined and a laser light beam is emitted from the side of the transparent resin part to weld both together is well known.

The principle of this method will be briefly described.

The laser light beam passes through the transparent resin virtually without being absorbed and is absorbed in the vicinity of the surface of the absorbent resin part. The energy of the laser light that has been absorbed is converted to heat and heats the surface of the absorbent resin part. The neighborhood of the surface of the resin of the transparent part contacting the surface of the absorbent resin part is also heated by heat transfer. As a result, a melt layer is formed on the contact surface between the transparent resin part and the absorbent resin part, which results in both resin parts being welded together.

As is apparent from the above-described principle, adhesion between the transparent resin part and the absorbent resin part is important during the welding process. This is because, when the adhesion between both is insufficient, the heat transfer from the absorbent resin part to the transparent resin part becomes insufficient, which leads to defective joining. Usually, in order to ensure surface adhesion between both resin parts, emission of the laser light beam is performed in a state where the transparent resin part and the absorbent resin part are pressure-welded by external pressure at the joint surface (e.g., see JP-A-2004-358697).

As mentioned above, during welding, the force of pressure-welding is applied to the melt layer formed at the joint portion, so melting proceeds at the melted portion until the emission of the laser light is stopped or the application of pressure is stopped. That is, the propinquity of the two parts proceeds. When the distance between the two parts is to be maintained at a predetermined value, a device for precisely detecting the distance between the two parts and a device for instantaneously stopping the emission of the laser light or the application of pressure become necessary. Moreover, the need to individually adjust dimensions with respect to each of the parts arises because there are dimensional variations in the parts. When these are to be realized, extremely expensive equipment becomes necessary.

Further, it is common for the laser light welding method to use a thermosetting resin in order to melt and fuse the resin. With a thermosetting resin, there is no problem whatsoever in the act of melting itself as a common molding method, and a predetermined shape can be created by pouring the resin into a mold using a predetermined pressure. At this time, resin performance such as physical strength and hydrolyzability drop because the resin strength drops if the predetermined pressure is not realized. It is easy for laser light welding to become weak with respect to an ordinary molded product in this point because there is no mold as in molding, the shape of the melted resin is free, and molding pressure is not applied.

For that reason, in regard to bodies where extremely high sealedness is required between the two parts, precise control during the joining process and extremely precise dimensional management at the melt surface become necessary, which has resulted in the joining method being expensive.

SUMMARY OF THE INVENTION

In view of the above-described points, it is an object of the present invention to provide a resin welded body and a manufacturing method thereof where the sinking amount at the joint portion is precisely managed without requiring precise control during the joining process and extremely precise dimensional management at the melt surface.

The present invention is a resin welded body where a first resin part that is absorbent with respect to laser light and a second resin part that is transparent with respect to laser light are fitted together and laser light is emitted to a predetermined position from the side of the second resin part to weld together the first and the second resin parts and form a joint portion between both resin parts. On either the first or the second resin part, there is disposed a projection that comes into contact with the other resin part during the welding and regulates the sinking amount at the joint portion.

Further, the present invention is a method of manufacturing a resin welded body where a first resin part that is absorbent with respect to laser light and a second resin part that is transparent with respect to laser light are fitted together, laser light is emitted to a predetermined position from the side of the second resin part, a pressuring force that presses together the first and the second resin parts is applied, and the first and the second resin parts are welded together to form a circumferential joint portion between the resin parts. The method includes: disposing, on either the first or the second resin part, a projection that is formed further on an inner side than the circumferential joint portion and comes into contact with the other resin part during the welding such that the projection regulates the sinking amount at the joint portion; and applying the pressuring force to a position on top, and further on the inner side, of the projection.

According to the resin welded body of the present invention, a high-quality resin welded body that has excellent strength can be obtained because the sinking amount at the joint portion can be easily and accurately regulated by the resin welded body itself.

Further, according to the resin welded body manufacturing method of the present invention, the sinking amount at the joint portion can be regulated by the projection of the resin welded body, the pressuring force during welding can be stably applied, and it becomes possible to obtain a high-quality resin welded body without having to perform precise control during the joining process and extremely precise dimensional management at the melt surface.

The foregoing and other objects, features, aspects, and advantages of the present invention will become more apparent from the following detailed description of the present invention when taken in conjunction with the accompanying drawings.

BRIEF DESCRIPTION OF THE DRAWINGS

Embodiments of the present invention will be described in detail below with reference to the accompanying drawings, wherein.

DETAILED DESCRIPTION OF THE INVENTION

Embodiment 1

Figure 1:
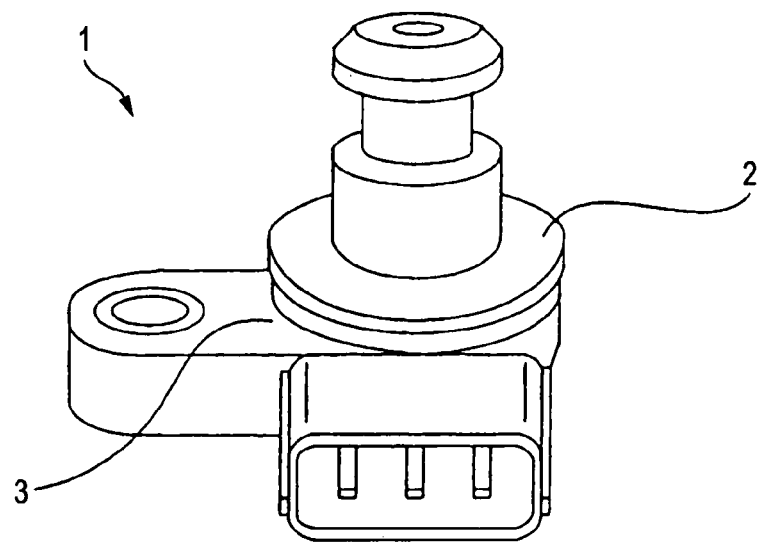
FIG. 1 is an external overall view of a resin welded body pertaining to embodiment 1 of the present invention.
Figure 2:
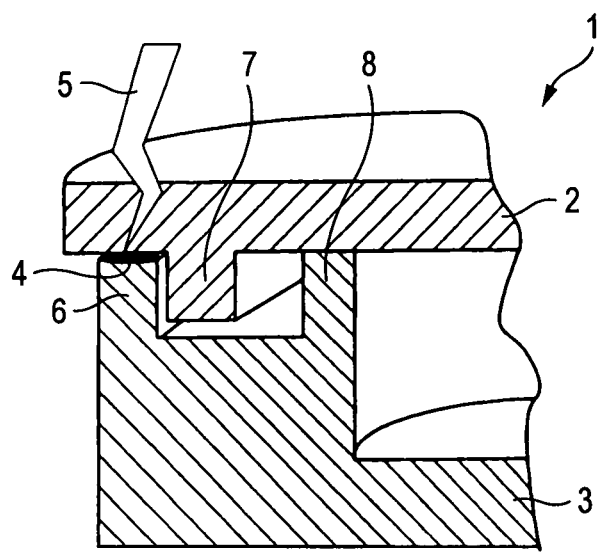
FIG. 2 is a partial cross-sectional view of the resin welded body pertaining to embodiment 1 of the present invention.

FIG. 1 and FIG. 2 are an external overall view and a partial cross-sectional view showing a resin welded body that is embodiment 1 of the present invention. Here, the resin welded body will be described by way of an airtight container 1 such as a pressure sensor configured by a bottomed circular cylinder-shaped case 3 and a lid 2.

The lid 2 of the airtight container 1 is a part comprising a resin that is transparent with respect to laser light, and the case 3 is a part comprising a resin that is absorbent with respect to laser light.

A rib 6 is annularly disposed along the outer form of the case 3, a positioning guide 7 annularly disposed on the lid body 2 is fitted together with the inner side of the rib 6, and the contact surface between the rib 6 and the lid 2 includes a joint portion 4 formed by welding by laser light 5.

Further, an annular projection 8 is disposed on the case 3 parallel to the rib 6 and on the inner side of the rib 6. The projection 8 extends orthogonally with respect to the open direction of the case 3, is set to a dimension slightly lower than the height dimension of the rib 6, and fulfills a stopper function for limiting the lid 2 from sinking too much toward the case 3 during later-described welding of the rib 6 to the lid 2.

In the airtight container 1 described above, the joint portion 4 is formed as follows. That is, laser light 5 is emitted from the side of the lid 2 as shown in a state where the lid 2 has been fitted together with the rib 6 of the case 3 utilizing the guide 7 and pressed until a position where the underside of the lid 2 comes into contact with the end surface of the rib 6. The laser light 5 that is emitted passes through the transparent lid 2, is absorbed by the distal end of the rib 6 disposed on the absorbent case 3, is converted to heat, and causes the joint portion 4 to melt. The joint portion 4 again solidifies when the emission of the laser light 5 stops, whereby welding of this place is realized.

In this welding process, when the joint portion 4 melts, the lid 2 sinks toward the case 3 but comes into contact with the projection 8 disposed on the case 3 so that the lid 2 is limited from sinking too much toward the case 3.

Consequently, by appropriately setting the dimension of the projection 8, the sinking amount at the joint portion 4 due to laser light welding can be easily and accurately regulated.

As described above, in embodiment 1, in a resin welded body where a first resin part that is absorbent with respect to laser light and a second resin part that is transparent with respect to laser light are fitted together and laser light is emitted to a predetermined position from the side of the second resin part to weld together the first and second resin parts and form a joint portion between both resin parts, a projection that comes into contact with the second resin part during the welding and regulates the sinking amount at the joint portion is disposed on the first resin part, whereby a high-quality airtight container can be obtained without requiring precise control and extremely precise dimensional management at the melted surface during the welding process.

It will be noted that, in the preceding description, the rib 6, the guide 7 and the projection 8 were all annular but they are not limited to this and may also be partially disposed.

Embodiment 2

Figure 3:
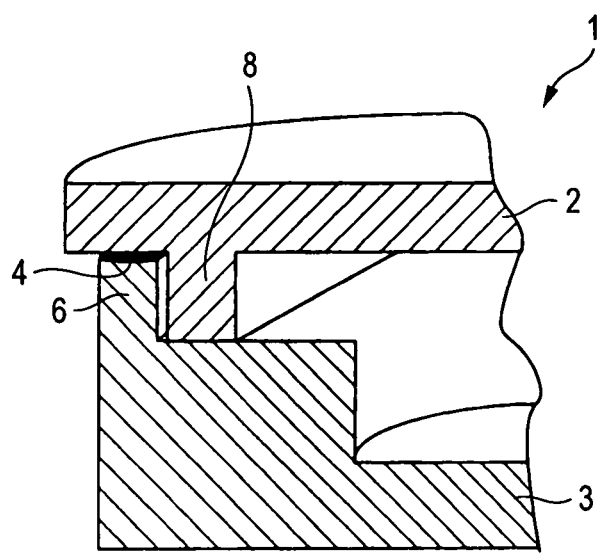
FIG. 3 is a partial cross-sectional view of a resin welded body pertaining to embodiment 2 of the present invention.

FIG. 3 is a partial cross-sectional view showing a resin welded body that is embodiment 2 of the present invention. In embodiment 2, the projection 8 is disposed on the lid 2, fulfills the same stopper function as the projection 8 of embodiment 1, and also doubles as the guide 7 for fitting the lid 2.

The projection 8 is set to a dimension that is slightly smaller than the height dimension of the rib 6, extends in an orthogonal direction that is the opposite of that of the rib 6 in a state where the lid 2 has been fitted together with the case 3, and limits the lid 2 from sinking too much toward the case 3 during welding of the rib 6 to the lid 2.

As described above, in embodiment 2, in a resin welded body where a first resin part that is absorbent with respect to laser light and a second resin part that is transparent with respect to laser light are fitted together and laser light is emitted to a predetermined position from the side of the second resin part to weld together the first and second resin parts and form a joint portion between the resin parts, a projection that comes into contact with the first resin part during the welding and regulates the sinking amount at the joint portion is disposed on the second resin part, whereby a high-quality airtight container can be obtained without requiring precise control and extremely precise dimensional management at the melt surface during the welding process.

Embodiment 3

Figure 4:
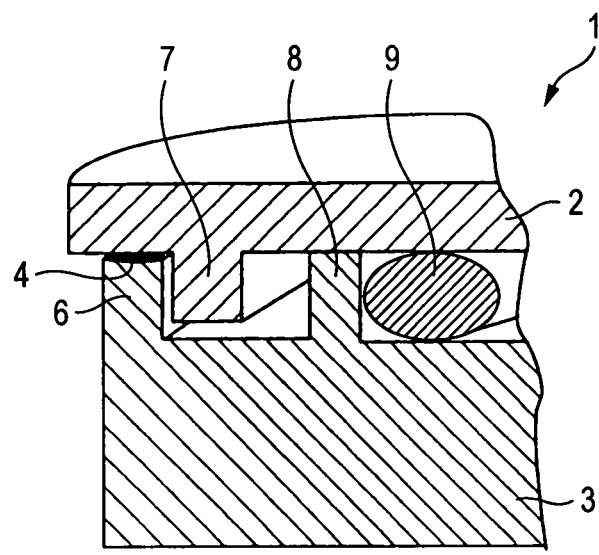
FIG. 4 is a partial cross-sectional view of a resin welded body pertaining to embodiment 3 of the present invention.

FIG. 4 is a partial cross-sectional view showing a resin welded body that is embodiment 3 of the present invention. Embodiment 3 is an embodiment when higher air-tightness is demanded in embodiment 1, and is configured such that a cross-sectionally circular seal member 9 is annularly disposed along the inner side of the projection 8 and the seal member 9 is pressed via the lid 2 during welding of the joint portion 4.

Figure 5:
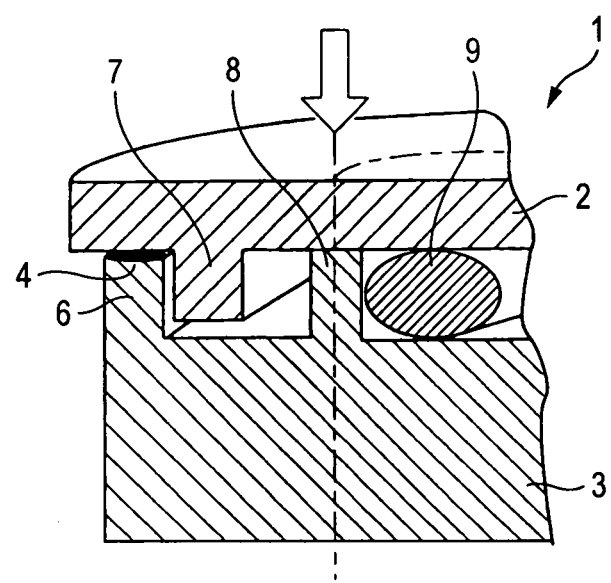
FIG. 5 is a partial cross-sectional view showing the application of pressure during welding of the resin welded body in embodiment 3 of the present invention.

In this case, as shown in FIG. 5, it is important for the position where the lid 2 applies pressure to be from the top (on the one-dotted chain line shown) to the inner side of the projection 8; thus, even when the sinking of the lid 2 at the joint portion 4 is insufficient, warpage occurs in the lid 2, so the projection 8 comes into contact with the lid 2 and a predetermined crushed amount can be imparted with respect to the seal member 9 without being affected by the state of the joint portion 4.

If the position where the lid 2 applies pressure were on the outer side with respect to the projection 8, a situation would arise where the projection 8 does not come into contact with the lid 2 due to warpage of the lid 2 even when the sinking of the lid 2 at the joint portion 4 is complete. In this situation, additional sinking of the lid 2 at the joint portion 4 becomes necessary in order to reliably bring the projection 8 into contact with the lid 2, and in predetermined conditions, a situation also arises where welding cannot be done.

Figure 6:
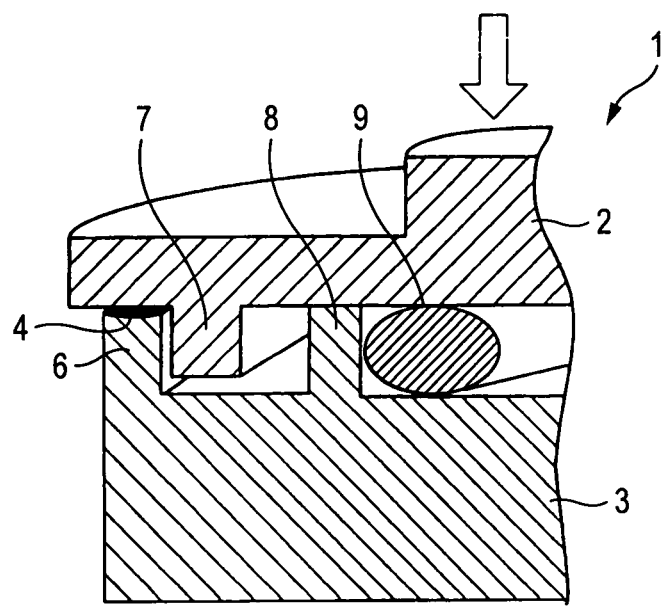
FIG. 6 is a partial cross-sectional view showing the application of pressure during welding of another resin welded body in embodiment 3 of the present invention.

It will be noted that even when there is a step portion 10 on the lid 2 as shown in FIG. 6, the same effects are obtained by applying pressure to the step portion 10.

As described above, according to embodiment 3, the seal member 9 that is pressed by the lid 2 is disposed on the inner side of the projection 8, so that even when flexure or the like resulting from dimension variations in parts or variations in their melted state occurs in the joint portion 4, stable sealedness is maintained regardless of the condition of the joint surface because the crushed amount of the seal member 9 is determined just by the dimension of the projection 8.

Further, when the seal member 9 is brought into contact with the side surface of the projection 8 as shown, the position of the seal member 9 is fixed and the projection 8 can be used as a guide when inserting the seal member 9. This is particularly effective when the seal member 9 is a ring-shaped part such as an O-ring, and products can be easily assembled.
Embodiment 4

Figure 7:
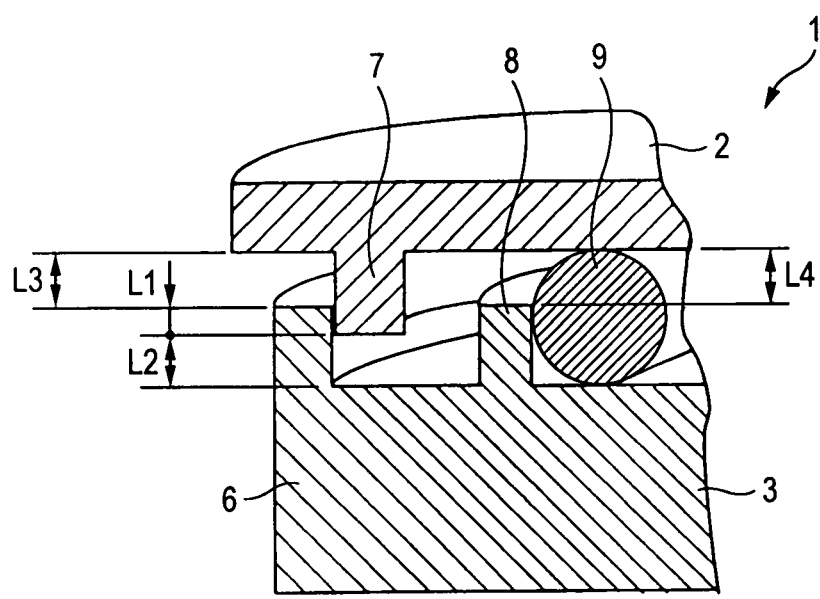
FIG. 7 is a partial cross-sectional view of a resin welded body prior to welding in embodiment 4 of the present invention.

FIG. 7 is an example of a resin welded body showing embodiment 4 of the present invention, configures the same airtight container 1 as embodiment 3, and is a partial cross-sectional view of a state where the lid 2 is fitted together with the case 3 but pressure before laser light welding is not applied thereto.

L1 in FIG. 7 is the overlapping dimension corresponding to the fitted amount of the guide 7 of the lid 2 and the rib 6 of the case 3, L2 is the height dimension of the rib 6, L3 is the distance dimension between the end surface of the rib 6 and the bottom surface of the lid 2, L4 is the distance dimension between the end surface of the projection 8 and the bottom surface of the lid 2, and the dimensions L1, L2, L3 and L4 are set to satisfy the relationship of $L1>0$ and $L2>L4>L3$.

Because of this dimensional relationship, easy assemblability and stable sealedness can be maintained without the parts that have been fitted together coming apart until welding.

Figure 8:
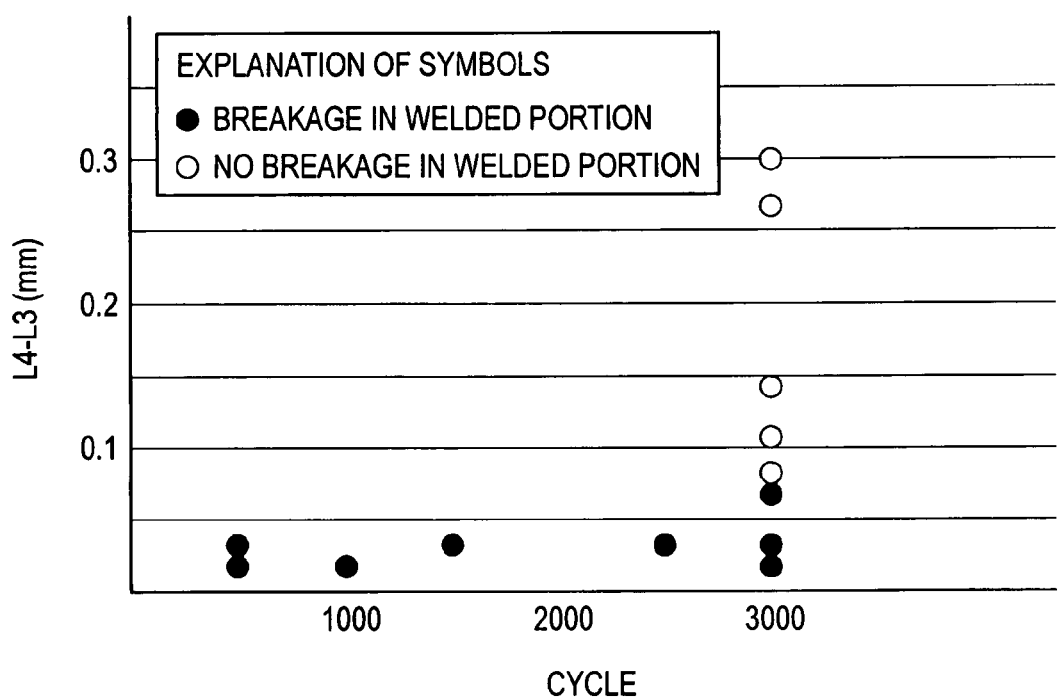
FIG. 8 is a characteristic diagram showing thermal shock resistance of the resin welded body in embodiment 4 of the present invention.

Particularly when $L4-L3>0.1$ mm—that is, when the sinking amount at the joint portion 4 during welding is set to be equal to or greater than 0.1 mm—then sufficient thermal shock resistance is obtained without breakage of the joint portion even with respect to a thermal shock of 3000 cycles, as shown in FIG. 8.

Various modifications and alterations of this invention will be apparent to those skilled in the art without departing from the scope and spirit of this invention, and it should be understood that this is not limited to the illustrate embodiments set forth herein.

What is claimed is:

1. A resin welded body where a first resin part that is absorbent with respect to laser light and a second resin part that is transparent with respect to laser light are fitted together and laser light is emitted to a predetermined position from the side of the second resin part to weld together the first and the second resin parts and form a joint portion between both resin parts, the joint portion being formed circumferentially and being provided at a tip of a rib, the resin welded body comprising:

a seal member disposed on an inner side of the joint portion and pressed by the welding of the first and the second resin parts; and a projection provided on either the first or the second resin part, for regulating the sinking amount of one of the first and the second resin parts relative to the other one at the joint portion upon the welding, and regulating the crushed amount of the seal member due to the pressing, wherein the projection is disposed between the joint portion and the seal member, and wherein a positioning guide is provided between the rib and the projection.

2. The resin welded body of claim 1 wherein the seal member is inserted using the projection as a guide and is pressed by a lid.

3. The resin welded body according to claim 1, wherein a space exists between said joint portion and said projection.

* * * * *